United States Patent [19]

Iwakawa

[11] Patent Number: 5,291,659
[45] Date of Patent: Mar. 8, 1994

[54] PLOTTING SYSTEM
[75] Inventor: Atsuhiro Iwakawa, Shizuoka, Japan
[73] Assignee: Roland DG Corporation, Shizuoka, Japan
[21] Appl. No.: 907,521
[22] Filed: Jul. 2, 1992
[30] Foreign Application Priority Data
 Jul. 3, 1991 [JP] Japan .................. 3-190687
 Jul. 23, 1991 [JP] Japan .................. 3-207376
 Jul. 31, 1991 [JP] Japan .................. 3-191922
[51] Int. Cl.5 ............................................. B43L 13/00
[52] U.S. Cl. ..................................... 33/18.1; 33/1 M
[58] Field of Search ...................... 33/18.1, 18.2, 1 M, 33/32.3, 32.1, 32.7, 35; 346/139 A

[56] References Cited
U.S. PATENT DOCUMENTS

| | | | |
|---|---|---|---|
| 4,665,619 | 5/1987 | Pearl | 33/1 M |
| 4,835,872 | 6/1989 | Perez et al. | 33/18.1 |
| 5,182,861 | 2/1993 | Suzuki et al. | 33/18.1 |

FOREIGN PATENT DOCUMENTS

| | | | |
|---|---|---|---|
| 0566687 | 11/1958 | Canada | 33/18.1 |
| 2558976 | 8/1985 | France | 33/18.1 |
| 59-122295 | 8/1984 | Japan . | |
| 1-14458 | 4/1989 | Japan . | |
| 1-122995 | 8/1989 | Japan . | |
| 403083699 | 4/1991 | Japan | 33/18.1 |
| 403173697 | 7/1991 | Japan | 33/18.1 |

Primary Examiner—William A. Cuchlinski, Jr.
Assistant Examiner—Alvin Wirthlin
Attorney, Agent, or Firm—Sandler, Greenblum & Bernstein

[57] ABSTRACT

A plotting system for a sheet, includes a stretching device for stretching a sheet, a plotting device, positioned at one side of the sheet for forming images on the sheet stretched by the stretching device, and a travelling hold device for holding the plotting device such that the plotting device travels back and forth in a first direction along the sheet stretched by the stretching device. The travelling hold device travels back and forth in a second direction along the sheet. A travelling pressure receiving device is positioned on another surface of the sheet, and the traveling pressure receiving device travels back and forth in the second direction at the same time as the travelling hold device travels in the second direction. The plotting system also includes a pressure receiving surface, extending in the first direction, that receives a pressing force of the plotting device through the sheet, and a first supporting device for supporting the plotting device, a second supporting device for supporting the stretching device and the traveling pressure receiving device and coupling means for coupling the first supporting device to the second supporting device so that the first supporting device and the second supporting device are separable from each other.

21 Claims, 6 Drawing Sheets

PLOTTING SYSTEM

BACKGROUND OF THE INVENTION

1. Field of the Invention

The present invention relates to plotting systems, and more particularly to plotters of the fixed sheet type, sheet cutting devices and similar devices.

2. Description of the Prior Art

There have been conventionally proposed plotters and sheet cutting devices of the fixed sheet type, in which a sheet is fixed on a flat bed by utilizing the adhesion effects of static electricity, or held between a magnetic band and a flat bed utilizing the magnetic effects. A pen, used for writing or cutting, is held on a traveling rail which travels in both directions, i.e., back and forth along the X-axis such that the pen travels in both directions, and back and forth along the Y-axis on the sheet held and fixed on the flat bed, whereby images are formed on the sheet using the pen for writing or cutting.

SUMMARY OF THE INVENTION

Such a plotter, however, has disadvantages in that the larger the size and area of the flat bed for holding and fixing the sheet thereon becomes, the more difficult it becomes to improve the flatness of the flat bed. Therefore, in order to maintain the flatness, there arises the necessity of reinforcing the frames and similar members for supporting the flat bed.

To overcome the above problem, the prime object of the invention is to provide an improved plotting system capable of forming images on a sheet without employing a flat bed whose flatness is difficult to improve and which therefore requires the reinforcement of the frames etc. for keeping the flatness.

In order to achieve the above object, the plotting system according to the invention includes:

(a) a stretching device for stretching a sheet;
(b) a plotting device for forming images on the sheet stretched by the stretching device, being positioned on the side of one surface of the sheet;
(c) a travelling hold device for holding the plotting device in such a way that the plotting device travels back and forth in a first direction along the sheet, stretched by the stretching device, with the travelling hold device travelling back and forth in a second direction along the sheet stretched by the stretching device; and
(d) a travelling pressure receiving device positioned on the side of the other surface of the sheet, stretched by the stretching device, with the travelling pressure receiving device travelling back and forth in the second direction concomitantly with the back and forth movements of the travelling hold device in the second direction, and including the pressure receiving surface that receives a pressing force of the plotting device through the sheet and extends in the first direction.

As has been understood from the above description, the plotting device is held, on the side of one surface of the sheet stretched by the stretching device, by means of the travelling hold device so as to move back and forth in the first direction along the stretched sheet. The travelling hold device travels back and forth in the second direction along the stretched sheet, whereby the plotting device can travel both in the first and second directions. On the side of the other surface of the sheet stretched by the stretching device, the travelling pressure receiving device travels back and forth in the second direction concomitantly with the back and forth movements of the travelling hold device in the second direction. The travelling pressure receiving device has a pressure receiving surface that receives the pressing force of the plotting device through the sheet, and extends in the first direction.

With the above arrangement, the pressing force of the plotting device travelling in the first and second directions, can be always received by the travelling pressure receiving device at the pressure receiving surface thereof through the sheet. This allows the plotting system to form images on the sheet without employing a flat bed whose flatness is difficult to improve upon, so that the reinforcement of the frames etc. is required in order to maintain the flatness.

According to a preferred embodiment, the plotting system further includes:

(a) a first supporting device for supporting the travelling hold device provided with the plotting device;
(b) a second supporting device for supporting the stretching device and the travelling pressure receiving device; and
(c) a coupling means for coupling the first supporting device to the second supporting device in such a way that they are separable from each other.

The coupling device is arranged such that when the first and second supporting devices are separated from each other, the sheet is stretched and fixed on the system by the stretching device or is removed from the system.

Alternatively, the plotting system further includes:

(a) a first supporting device for supporting the stretching device and the travelling hold device provided with the plotting device
(b) a second supporting device for supporting the travelling pressure receiving device; and
(c) a coupling device for coupling the first supporting device to the second supporting device in such a way that they are separable from each other.

The coupling device is arranged such that when the first and second supporting devices are separated from each other, the sheet is stretched and fixed on the system by the stretching device or is removed from the system. The above arrangements facilitate the fixing and removing of the sheet.

The above-described plotting system may be designed such that the first supporting device is laid on the second supporting device in layers, so that the sheet stretched by the stretching device is oriented horizontally and so that images are formed on the sheet from above by the plotting device. The first supporting device and the second supporting device are both connected, at one end, to the coupling device by which the first supporting means is pivoted with respect to the second supporting device, thereby separating the first and second supporting device from each other.

Alternatively, it is possible to design the plotting system such that the first and second supporting devices are arranged to stand up to engage each other, so that the sheet stretched by the stretching device is inclined at a specified angle, and so that images are formed on the sheet from a diagonally upper position by means of the plotting device. The first supporting device and the second supporting device are both connected, at the lower ends thereof, to the coupling device by which the first and second supporting devices are relatively pivoted, thereby separating the first and second supporting devices from each other.

The pressure receiving surface of the travelling pressure receiving device may be the circumferential surface of a cylindrical body having an axis which extends in the first direction, or alternatively may be a flat surface extending in the first direction. Preferably, as the travelling pressure receiving device travels in the second direction, the cylindrical body rotates such that the circumferential surface thereof comes in contact with the other surface of the sheet in a rolling manner. This arrangement prevents contact resistance between the other surface of the sheet and the pressure receiving surface.

It is also preferable to provide the first supporting device with a transparent cover on a side at which the sheet stretched by the stretching device can be seen over the plotting device. The plotting device may be a pen used for writing or cutting.

Other objects of the present invention will become apparent from the detailed description given hereinafter. however, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1 through 5 are diagrams illustrating a plotting system, according to a first embodiment of the invention;

DESCRIPTION OF THE PREFERRED EMBODIMENTS

Referring now to the drawings, preferred embodiments of the plotting system according to the invention will be described.

First Embodiment

There will be given an explanation on a sideways-installed plotting system, according to an embodiment of the invention, in which a sheet is horizontally oriented and images are formed on the sheet from above, by the use of a pen.

In FIGS. 1 through 4, a plotting system A includes a fixed frame 1 and a movable frame 2 laid on the fixed frame 1, in layers. The fixed frame 1 and the movable frame 2 are connected to each other by means of a hinge 4 at a longitudinal side of the plotting system A (at the left end of the plotting system A in FIGS. 2 through 4), so that the movable frame 2 can pivot with respect to the fixed frame 1 and is separable from the fixed frame 1 in a vertical direction.

Figure 2:
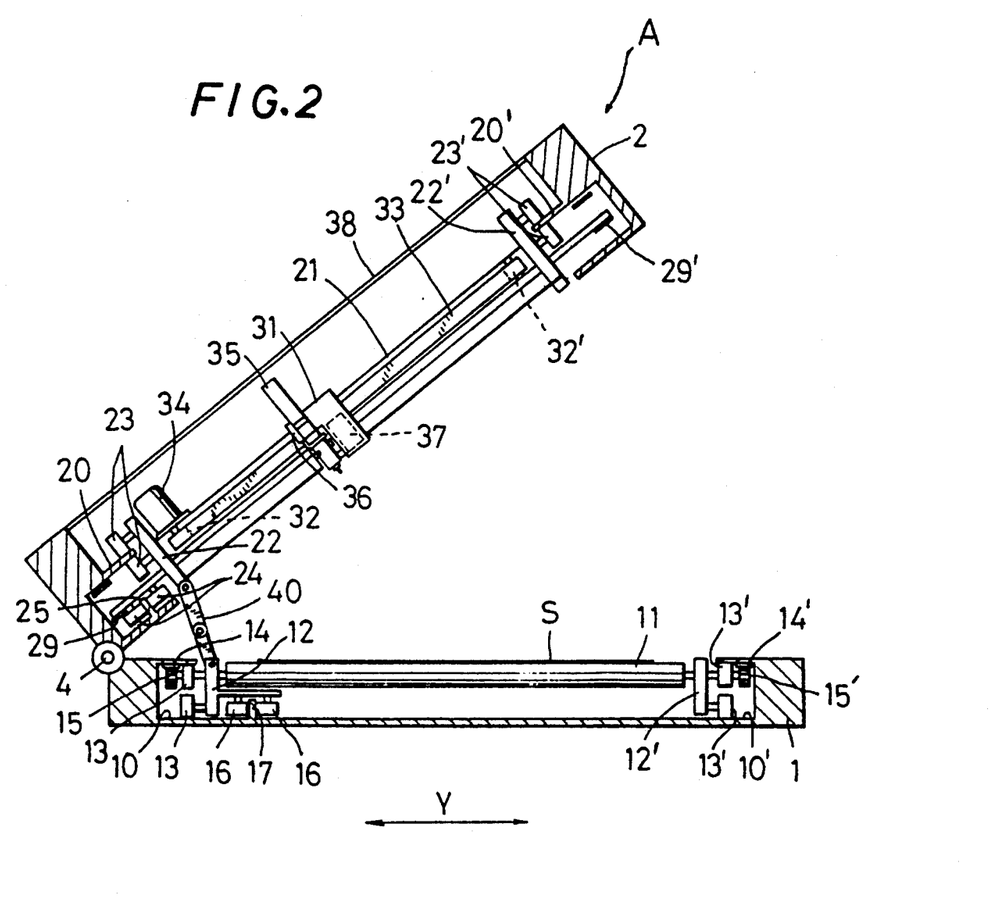
FIG. 2 is a cross section of an essential part of the plotting system in which the movable frame is lifted from the plotting position, being separated from the fixed frame.
Figure 3:
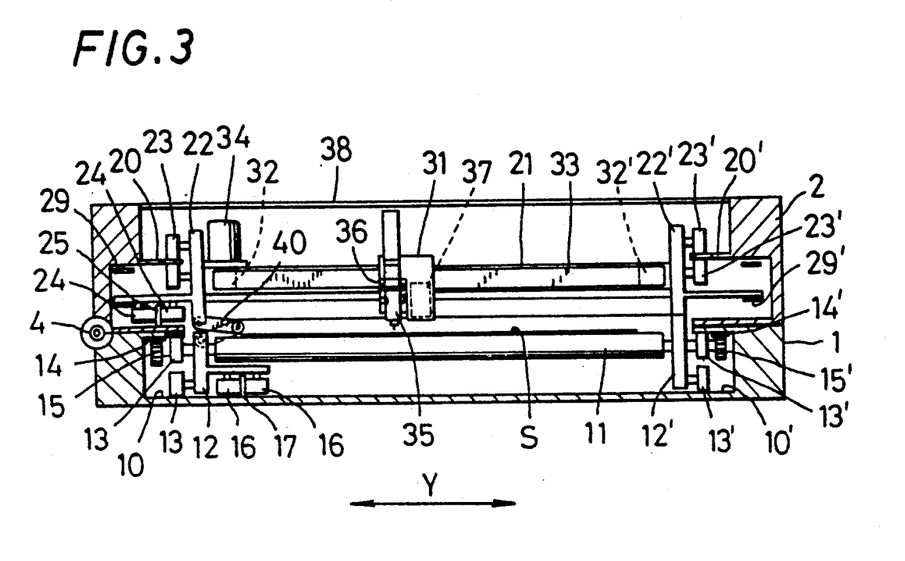
FIG. 3 is a cross section of the essential part of the plotting system in which the movable frame is located in a plotting position.

As shown in FIGS. 2 and 3, disposed on the fixed frame 1 are a pair of ⊐-shaped or C-shaped first X rails 10 and 10' that are parallel to each other and extend in an X-axis direction, with a specified space between. There is provided a cylindrical pressure receiving roll 11 located between the pair of first X rails 10 and 10'. The pressure receiving roll 11 has an axis extending in a Y-axis direction, with a smooth and hard surface. The pressure receiving roll 11 is supported by means of a pair of first travelling supporters 12 and 12' at both ends thereof. The first travelling supporter 12 is provided with two pairs of guide rollers 13, while the first travelling supporter 12' is provided with two pairs of guide rollers 13' (only one pair of guide rollers 13 and one pair of guide rollers 13' are shown in FIGS. 2 and 3). The two pairs of guide rollers 13 are aligned in the X-axis direction as well as the two pairs of guide rollers 13'. One of the pair of guide rollers 13 is engaged with the upper face of the ⊐-shaped or C-shaped first X rail 10, so that the guide roller 13 travels in a rolling manner and the other is engaged with the lower face of the first X rail 10 in the same way as mentioned above. The same arrangement is applied to the pairs of guide rollers 13'. The guide rollers 13 and 13' travel in a rolling manner on the upper and lower faces of the first X rails 10 and 10', thereby guiding the pressure receiving roll 11 to move in the X-axis direction. The ends of the pressure receiving roll 11, in the axial direction, are provided with pinions 15 and 15' that mesh with racks 14 and 14' respectively. The racks 14 and 14' are provided on the upper faces of the first X rails 10 and 10' respectively. A sheet S is stretched on the upper side of the pressure receiving roll 11, and the pressure receiving roll 11 rotates at the same time that it travels in the X-axis direction so that the circumferential surface of the pressure receiving roll 11 comes in contact with the back surface of the sheet S in a rolling manner. There are provided two pairs of guide rollers 16 aligned in the X-axis direction under a projection piece that extends to the right from the first travelling supporter 12 positioned at the left hand (only one pair of guide rollers 16 is shown in FIGS. 2 and 3). Each of the pairs of guide rollers 16 holds a guide 17 thereto therebetween so as to prevent the pressure receiving roll 11 from deviating from its travelling course, with the guide 17 being attached to the fixed frame 1. The travelling course of the pressure receiving roll 11 is thus determined by the guide rollers 16, the guide 17, the first X rails 10, 10' and the guide rollers 13, 13'.

Figure 1:
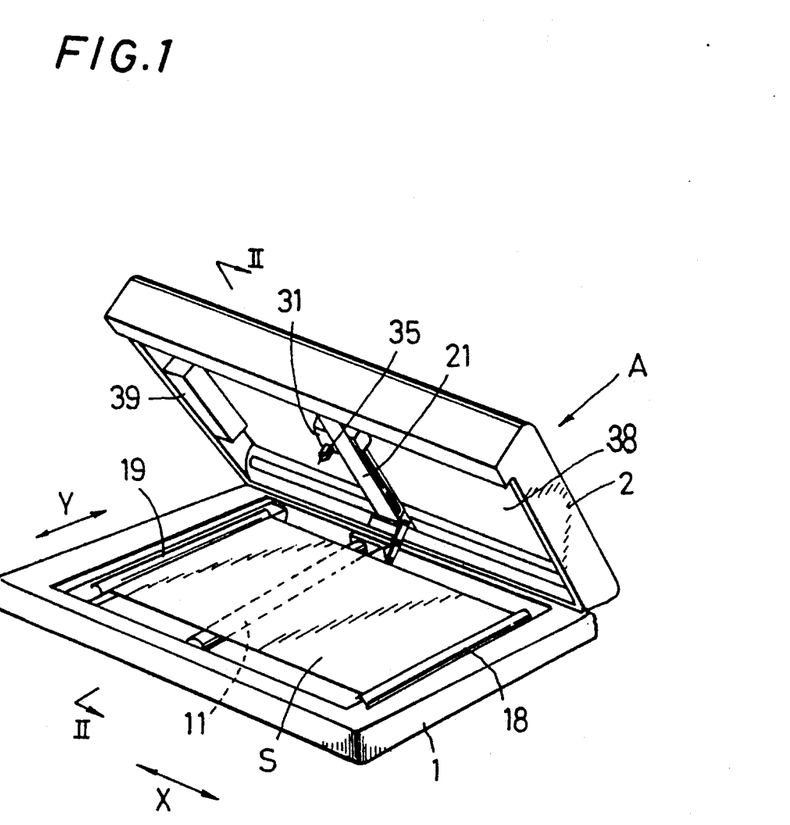
FIG. 1 is a perspective view showing the whole structure of the plotting system in which a movable frame is lifted from a plotting position, being separated from a fixed frame.
Figure 4:
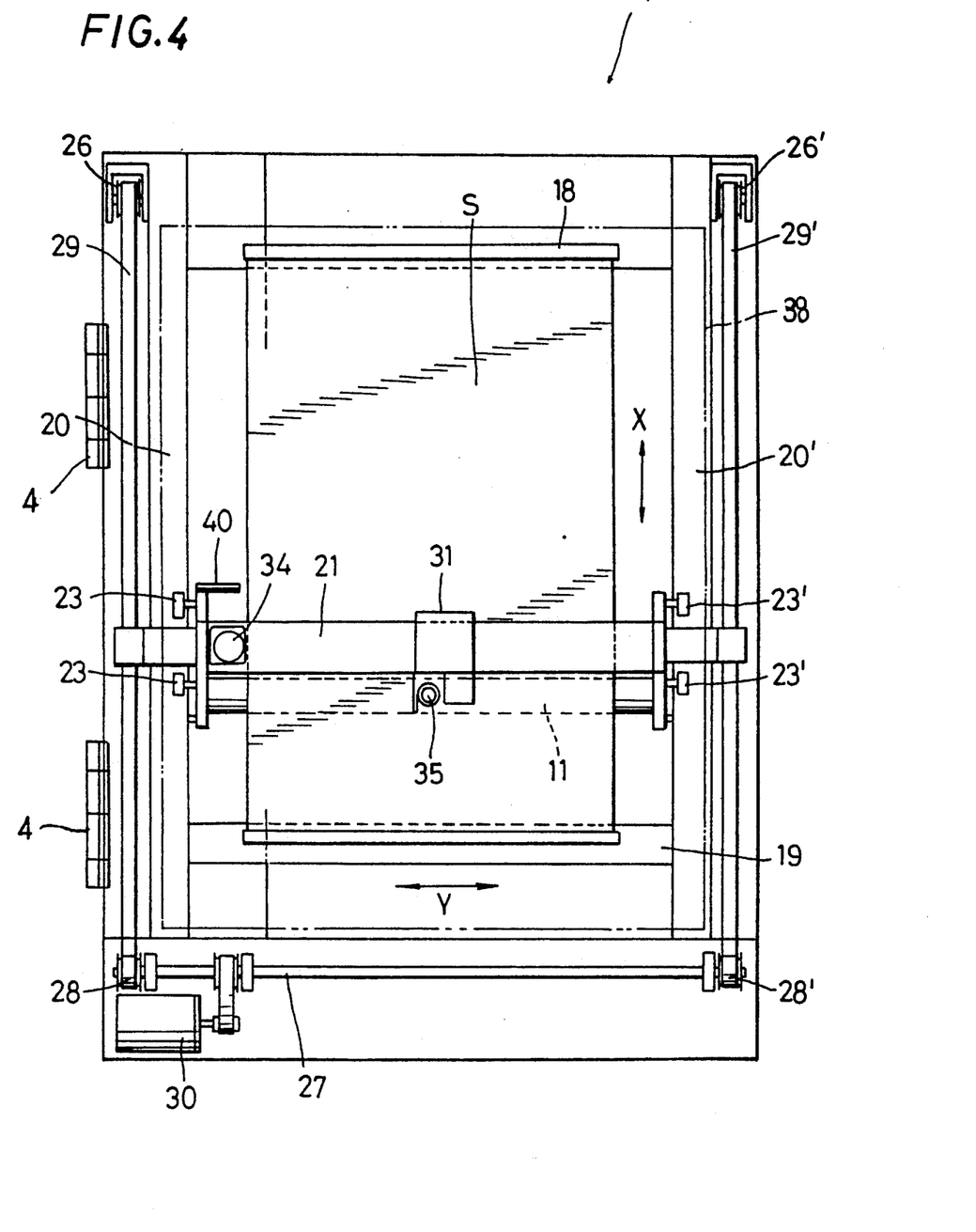
FIG. 4 is a partially cut-away plan view of the plotting system in which the movable frame is located in the plotting position.

As shown in FIGS. 1 and 4, provided on the upper face of the fixed frame 1, are a paper holder 18 and a sheet holding member 19 which are located between the pair of first X rails 10 and 10'. The paper holder 18, for fixedly pinching one side of the sheet S, is located at the upper end of the system in FIG. 4. The sheet holding member 19, provided at the lower end of the system in FIG. 4, has an appropriate width, and stops at a desired position in the X-axis direction along the first X rails 10 and 10'. The sheet holding member 19 may be made up of a narrow supporting board and a holding piece in the form of a clip fixed on the supporting board. Alternatively, a supporting board made of a magnet may be used in combination with a magnet plate. The supporting board, as described above, is guided by a guide (not shown) disposed at the first X rails 10 and 10', and is stopped at a desired position in the X-axis direction. The sheet S is held and stretched by the paper holder 18 and the sheet holding member 19, so that it is fixed in a horizontal condition.

As shown in FIGS. 2 through 4, the movable frame 2 is provided with a pair of second X rails 20 and 20' that are parallel to each other and extend along the X-axis direction with a specified space between. The movable frame 2 is also provided with a Y rail 21 that extends in the Y-axis direction between the second X rails 20 and 20'. The Y rail 21 is provided with a second travelling supporter 22 at one end and a second travelling supporter 22' at the other end. The second travelling supporter 22 is provided with two pairs of guide rollers 23, while the second travelling supporter 22' is provided with two pairs of guide rollers 23'. Each of the two pairs of guide rollers 23 holds the second X rail 20 therebetween, and each of the two pairs of guide rollers 23' holds the second X rail 20' therebetween, whereby the Y rail 21 is guided by the second X rails 20 and 20' to travel in the X-axis direction. There are provided two pairs of guide rollers 24 aligned in the X-axis direction under a projection piece that extends to the left from the second travelling supporter 22 positioned at the left hand (only one pair of guide rollers 24 is shown in FIGS. 2 and 3). Similarly to the guide rollers 16, each of the pairs of guide rollers 24 holds a guide 25 between so as to prevent the Y rail 21 from deviating from its travelling course, with the guide 25 being attached to the movable frame 2. As shown in FIG. 4, the Y rail 21 is engaged with a driving belt 29 at one end and a driving belt 29' at the other end. The driving belts 29 and 29' are wound around pulleys 26 and 26', respectively, at the side of the upper ends of the second X rails 20 and 20'. The driving belts 29 and 29' are also wound around pulleys 28 and 28', respectively. The pulleys 28 and 28' are mounted on the ends of a line shaft 27 located at the side of the lower ends of the second X rails 20 and 20'. The driving belts 29 and 29' are driven back and forth through the line shaft 27 by means of a driving motor 30, provided at the lower left hand, whereby the Y rail 21 travels back and forth in the X-axis direction at a required speed.

There is provided a pen carriage 31 mounted on and guided by the Y rail 21, so as to travel in the Y-axis direction. In FIGS. 2 and 3, the pen carriage 31 is engaged with a driving belt 33 at an appropriate position. The driving belt 33 is wound around a pair of pulleys 32 and 32' located on the sides of the ends of the Y rail 21. The driving belt 33 is driven back and forth by a driving motor 34 disposed at the left end of the Y rail 21, whereby the pen carriage 31 travels back and forth in the Y-axis direction at a required speed. The pen carriage 31 includes a bracket 36 into and from which a pen 35 for writing or cutting can be inserted and removed, and a plunger 37 for vertically moving the bracket 36 together with the pen 35.

Disposed on the upper surface of the movable frame 2 is a transparent cover 38 for covering the stretched sheet S during plotting by the pen 35. The provision of the transparent cover 38, combined with the outer shells of the fixed frame 1 and the movable frame 2 form a hermetically sealed space, protecting the sheet S, during plotting, from wind etc. coming from the outside of the system. This also contributes to the insulation of noise. Moreover, how images are formed on the sheet S can be seen over the pen 35 through the transparent cover 38. The movable frame 2 is provided with a pen stocker 39, as shown in FIG. 1.

Figure 5:
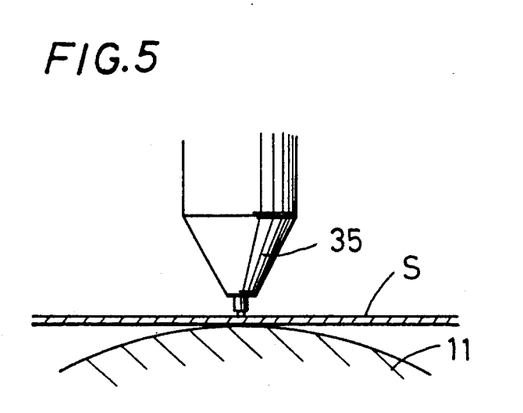
FIG. 5 is an enlarged section of an essential part of the plotting system in a plotting condition.
Figure 7:
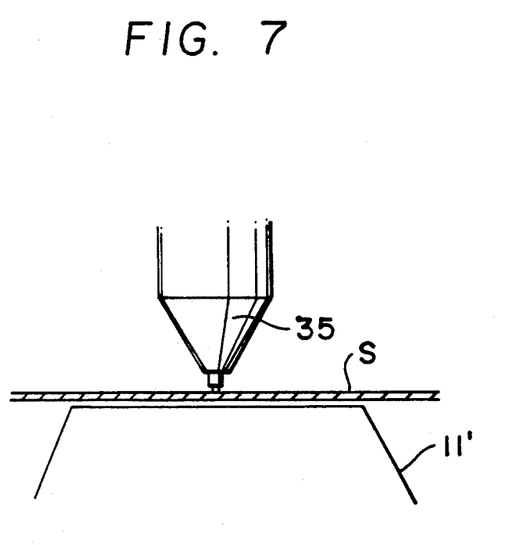
FIG. 7 is an enlarged section of an essential part of the plotting system according to an alternative embodiment of the invention in a plotting condition.

At the left portion of FIGS. 2 through 4 (i.e., the longitudinal side of the system), where the fixed frame 1 and the movable frame 2 are coupled to each other by the hinge 4, there is provided a link 40 which can bend itself double at its middle position. The link 40 is positioned between and connected to the first travelling supporter 12 located at the left of the pressure receiving roll 11 in the fixed frame 1 and the second travelling supporter 22 at the left of the Y rail 21 in the movable frame 2. There is provided a lock mechanism (not shown) between the first travelling supporter 12; at the right of the pressure receiving roll 11 in the fixed frame 1, and the second travelling supporter 22; at the right of the Y rail 21 in the movable frame 2. When the movable frame 2 is forced down in a plotting position, the pressure receiving roll 11 and the Y rail 21 are kept in an appropriate positional relationship by the lock mechanism. With the above arrangement, the pressure receiving roll 11 travels concomitantly with the movement of the Y rail 21 driven by the driving motor 30. Accordingly, not only when the pen carriage 31 travels in the Y-axis direction, being guided by the Y rail 21, but also when the Y rail 21 travels in the X-axis direction, being guided by the second X rails 20 and 20', the pen 35 is always positioned on the circumferential surface of the pressure receiving roll 11 from above as shown in FIG. 5. In FIG. 5, a writing pen is illustrated as the pen 35, and makes a right angle with the axis of the pressure receiving roll 11 so that the pressing force of the pen 35 is received by the pressure receiving roll 11. As shown in FIG. 7, according to an alternative embodiment of the present invention, the pressure receiving surface of the travelling pressure receiving means 11' can be a flat surface extending in the first direction.

To temporarily hold the movable frame 2 fixedly with respect to the fixed frame 1, a lock mechanism (not shown) is provided at an appropriate position of the movable frame 2. A control circuit for controlling the driving motors 30 and 34, the plunger 37 etc. and a contact terminal for connecting the control circuit to an external computer are provided at appropriate positions of the fixed frame 1 and/or the movable frame 2. The movable frame 2 is also provided with a control panel connected to the control circuit.

In the plotting system, according to the above-described embodiment, preparations (including mounting of the sheet S) for plotting are made through a specific procedure. First, the movable frame 2 is pivoted on the hinge 4 thereby being lifted. Then, the movable frame 2 is separated from the fixed frame 1 to create an open space above the upper surface of the fixed frame 1. After the sheet S has been fixed on the upper surface by holding and stretching it with the paper holder 18 and the sheet holding member 19, the movable frame 2 is forced down onto the stretched sheet S. When the sheet S is removed from the system, the reverse procedure may be taken.

After the plotting system has been thus prepared, the control panel is operated in a specified manner so that data is supplied to the control circuit via the contact terminal from the external computer. According to the data thus supplied, the driving motors 30 and 34, the plunger 37 etc. are actuated so that the Y rail 21 travels back and forth in the X-axis direction. The pen carriage 31 travels back and forth on the Y rail 21 in the Y-axis direction. The pen 35 is moved up and down by means of the plunger 37 at the pen carriage 31, whereby images are formed on the fixedly stretched sheet S. In the case that images are formed on the sheet S with the pen 35, in the X-axis direction, the pressure receiving roll 11 and the Y rail 21 linked thereto by the link 40 travel in integrated form in the X-axis direction, holding the sheet S therebetween. In the case that images are formed in the Y-axis direction on the other hand, the pressure receiving roll 11 and the Y rail 21 do not travel, but only the pen 35 moves in the Y-axis direction with the help of the pen carriage 31. When the pressure receiving roll 11 and the Y rail 21 travel in integrated form in the X-axis direction, the pressure receiving roll 11 rotates, as mentioned above, with the help of the racks 14 and 14' and the pinions 15 and 15; while the circumferential surface of the pressure receiving roll 11 comes in contact with the back face of the sheet S that is fixed and stretched. With this arrangement, contact resistance between the pressure receiving roll 11 and the sheet S is extremely reduced so that smooth plotting can be achieved even when the tension of the sheet S is small. It is preferably to apply treatment for reducing friction resistance between the pressure receiving roll 11 and the sheet S, thereby restricting the occurrence of static electricity.

In the foregoing embodiment, the cylindrical pressure receiving roll 11 with an axis extending in the X-axis direction is brought into contact with the back face of the sheet S during rotation. It is also possible to employ a plate having a flat surface extending in the X-axis direction and to bring such a plate into contact with the back face of the sheet S in a sliding manner in the case that there is no need to reduce contact resistance. The rotation of the pressure receiving roll 11, while travelling in the X-axis direction, is achieved by the racks 14 and 14' and the pinions 15 and 15' in the embodiment, but the rotation may be achieved by the employment of a roller which has a tread made from elastic material such as urethane rubber and is positioned at the axial ends of the pressure receiving roll 11, so as to come in pressure-contact with the upper face of the first X rail 10 while rotating.

Second Embodiment

Another embodiment of the plotting system will be hereinafter explained. This plotting system is the vertically-installed type in which the sheet is inclined at a specified angle and images are formed on the sheet from a diagonally upper position using a pen. Only points which differ from the first embodiment will be explained, and an explanation on similar points to the first embodiment will be omitted.

Figure 6:
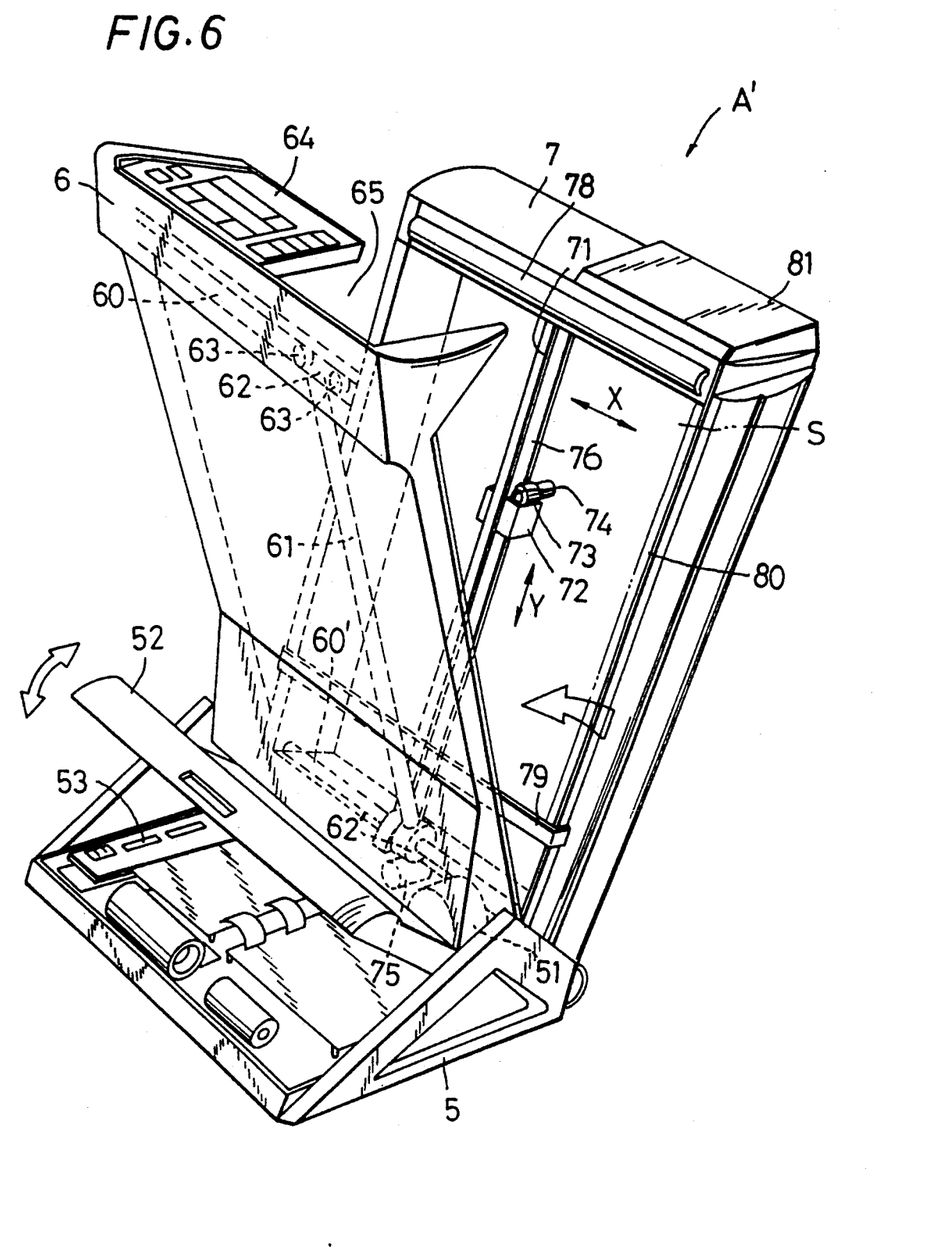
FIG. 6 is a perspective view showing the whole structure of a plotting system, according to a second embodiment of the invention, in which a movable frame is moved forwards, being separated from a fixed frame.

As shown in FIG. 6, a plotting system A' is composed of a base frame 5, a fixed frame 6 and a movable frame 7. The fixed frame 6 rises from the base frame 5 in a fixed condition, being inclined backwards at a specified angle e.g., about 70° with respect to the horizontal plane. The movable frame 7 is pivotally supported, at the lower end thereof, on the base frame 5 by means of a hinge (not shown) so as to pivot through a specified angle, whereby the movable frame 7 can mate with the fixed frame 6, leaning against it and can be separated from the same. In FIG. 6, the rear side of the movable frame 7 is the front side of the system A' to which the operator faces when operating it.

The front face of the fixed frame 6 is provided with a pair of first X rails 60 and 60' at the upper part and the lower part close to the base frame 5. The first X rails 60 and 60' are parallel horizontally to each other and extend in an X-axis direction with a specified space between. The first X rail 60 at the upper part is ⊐-shaped or C-shaped whilst the first X rail 60' at the lower part takes the form of a column. Provided between the first X rails 60 and 60' is a cylindrical pressure receiving roll 61 the axis of which extends in a Y-axis direction. The pressure receiving roll 61 is supported by way of travelling supporters 62 and 62' attached to the ends thereof. The travelling supporter 62 at the upper end of the pressure receiving roll 61 is provided with a pair of guide rollers 63 which rotatably engage with the opposite faces of the ⊐-shaped or C-shaped X rail 60. The travelling supporter 62' at the lower end is pierced by the cylindrical first X rail 60' in the X-axis direction. With the above arrangement, the pressure receiving roll 61 is guided by the first X rails 60 and 60' to travel in the X-axis direction whilst being rotated with the help of racks and pinions (not shown). The fixed frame 6 is provided with a control panel 64 at the top.

In the movable frame 7, a Y rail 71 extending in the Y-axis direction is provided at the face opposite to the fixed frame 6. The upper end of the Y rail 71 is guided to a second X rail (not shown) extending in the X-axis direction at the inner side of the upper end of the movable frame 7. The lower end of the Y rail 71 is pierced, in the X-axis direction, by the first X rail 60' disposed at the lower end part of the fixed frame 6, and is pivotally engaged with the travelling supporter 62; so as to be guided to the first X rail 60'. When the movable frame 7 mates with the fixed frame 6, the Y rail 71 is in parallel to the pressure receiving roll 61, disposed at the fixed frame 6 with a specified space therebetween. A pen 74, removably inserted in a bracket 73 which constitutes a pen carriage 72 installed on the Y rail 71, is positioned on the circumferential surface of the inclining pressure receiving roll 61 from a diagonally upper position. Similarly to the first embodiment, the pen 74 is positioned, making a right angle with the axis of the pressure receiving roll 61. The pen carriage 72, installed on the Y rail 71, is guided by the Y rail 71 and driven through a driving belt 76 by a driving motor 75 provided at the lower end of the Y rail 71 so that it travels back and forth in the Y-axis direction. The pressure receiving roll 61 and the Y rail 71, which are pivotally engaged with each other, are guided by the first X rails 60 and 60' and the second X rail and driven by a driving motor 51 disposed within the base frame 5, so as to travel back and forth in the X-axis direction in an integral fashion.

The movable frame 7 is provided with a paper holder 78 at the upper edge of the face opposite to the fixed frame 6. The paper holder 78 is for fixedly pinching one side of the sheet S. At the lower part of the movable frame 7, there is provided a sheet holding member 79 that is moved along guides disposed at both sides of the movable frame 7 and stopped at a desired position.

Similarly to the first embodiment, a holding piece, in the form of a clip fixed on a narrow supporting board, may be employed as the sheet holding member 79. A transparent cover 80 is provided at the front side of the movable frame 7, so that the sheet S can be seen over the pen 74. The provision of the cover 80, combined with the outer shells of the fixed frame 6 and the movable frame 7, forms a hermetically sealed space during plotting.

The fixed frame 6 and the movable frame 7 are designed such that when the movable frame 7 leans against and mates with the fixed frame 6, the movable frame 7 is nested in and supported by the fixed frame 6. In the above arrangement, a pen stocker 81, located at the top of the movable frame 7, is designed to be nested in a recess 65 provided at the top of the fixed frame 6. The upper part of the front face of the movable frame 7 is provided with a handle part (not shown) for raising and lowering the movable frame 7.

The base frame 5 is designed to have enough size to keep the fixed frame 6 and the movable frame 7, as well as the members supported by those frames 6 and 7 such as the pressure receiving roll 61 and the Y rail 71 for holding the pen carriage 72, in a stable condition. Disposed at the rear side of the fixed frame 6 is a lid 52 for creating an internal space to accommodate the control circuit for controlling the driving motors 51 and 75, plungers and other members, the control circuit being connected to the control panel 64. To connect the control circuit to an external computer, a contact terminal 53 and an AC inlet are provided on the upper surface of the base frame 5.

In the plotting system of the above-described embodiment, preparations (including mounting of the sheet S) for plotting are made through a specific procedure. First, the movable frame 7 is pulled forwards by manipulating the handle part so as to be pivoted on the hinge and pulled away from the fixed frame 6. The movable frame 7 is thus separated from the fixed frame 6 to create an open space at the back of the movable frame 7. After the sheet S has been stretched and fixed by means of the paper holder 78 and the sheet holding member 79, similar to the first embodiment, the movable frame 7 is forced back onto the stretched sheet S.

In the plotting system thus prepared, the pressure receiving roll 61, which is positioned at the fixed frame 6 and is pivotally engaged with the Y rail 71, and the Y rail 71, for holding the pen carriage 72 at the movable frame 7, are inclined. The pressure receiving roll 61 and the Y rail 71 are parallel with each other so that the pen 74 is kept in a position from which the pen 74 can be easily let down vertically onto the stretched sheet S as well as the circumferential surface of the pressure receiving roll 61. After the plotting system has been thus prepared, the control panel 64 is operated in a specified manner so that data is supplied to the control circuit from the external computer. According to the data thus supplied, the pressure receiving roll 61 and the Y rail 71, which are pivotally engaged with each other, travel back and forth together in the X-axis direction, and the pen carriage 72 travels back and forth on the Y rail 71 in the Y-axis direction, whereby images are formed on the fixedly stretched sheet S. When the pressure receiving roll 61 and the Y rail 71 travel in an integral fashion in the X-axis direction, the pressure receiving roll 61 rotates with the help of the racks and pinions as mentioned above, so that the circumferential surface of the pressure receiving roll 61 comes in contact with the back face of the fixedly stretched sheet S in a rolling manner.

In the plotting system A' of the second embodiment, heavy or bulky members such as the driving motors 51 and 75 and the control circuit are placed on the base frame 5, thereby keeping the weight-balance of the entire body of the system A', while members, other than the above, are made lightweight and are arranged in tandem, thereby enabling the plotting system A' to be installed in a small space.

In the above embodiment, the sheet S is fixedly stretched on the back face of the movable frame 7, but it is also possible to stretch and fix the sheet S on the front face of the fixed frame 6.

With the invention being thus described, it will be obvious that the same may be varied in many ways. Such variations are not to be regarded as a departure from the spirit and scope of the invention, and all such modifications, as would be obvious to one skilled in the art, are intended to be included within the scope of the following claims.

What is claimed is:

1. A plotting system comprising:
   stretching means for stretching a sheet;
   plotting means for forming images on the sheet stretched by the stretching means, being positioned on a side of one surface of the sheet;
   travelling hold means for holding the plotting means such that the plotting means travels back and forth in a first direction along the sheet stretched by the stretching means; the travelling hold means travelling back and forth in a second direction along the sheet stretched by the stretching means;
   travelling pressure receiving means positioned on another surface of the sheet stretched by the stretching means, the travelling pressure receiving means travelling back and forth in the second direction concomitantly with back and forth movements of the travelling hold means in the second direction and including a pressure receiving surface that receives a pressing force of the plotting means through the sheet and extends in the first direction;
   first supporting means for supporting the plotting means;
   second supporting means for supporting the stretching means and the travelling pressure receiving means; and
   coupling means for coupling the first supporting means to the second supporting means, so that the first supporting means and the second supporting means are separable from each other,
   wherein, when the first and second supporting means are separated from each other, the sheet is stretched and fixed on the system by the stretching means, or is removed from the system.

2. The plotting system as claimed in claim 1, wherein the first supporting means is positioned over the second supporting means so that the sheet stretched by the stretching means is oriented horizontally, and so that images are formed on the sheet by the plotting means.

3. The plotting system, as claimed in claim 2, wherein the first supporting means and the second supporting means are both connected to the coupling means at one end thereof so that the first supporting means is pivoted on the coupling means with respect to the second supporting means so as to be separated from the second supporting means.

4. The plotting system as claimed in claim 1, wherein the first and second supporting means engage each other, so that the sheet, stretched by the stretching means, is inclined at a specified angle, and so that images are formed by the plotting means from a diagonal position above the sheet.

5. The plotting system as claimed in claim 4, wherein the first supporting means and the second supporting means include lower ends, and are both connected to the coupling means at the lower ends thereof, so that the first supporting means and the second supporting means are relatively pivoted on the coupling means, so as to be separated from each other.

6. The plotting system as claimed in claim 1, further comprising a transparent cover provided on a side of the first supporting means, at which the sheet, stretched by the stretching means, can be seen over the plotting means.

7. The plotting system, as claimed in claim 1, wherein the pressure receiving surface of the travelling pressure receiving means is a circumferential surface of a cylindrical body whose axis extends in the first direction.

8. The plotting system, as claimed in claim 7, wherein the cylindrical body rotates such that the circumferential surface thereof comes in contact with the other surface of the sheet in a rolling manner as the travelling pressure receiving means travels in the second direction.

9. The plotting system as claimed in claim 1, wherein the pressure receiving surface of the travelling pressure receiving means is a flat surface extending in the first direction.

10. The plotting system, as claimed in claim 1, wherein the plotting means is a pen for writing or cutting.

11. A plotting system comprising:
stretching means for stretching a sheet;
plotting means for forming images on the sheet stretched by the stretching means, being positioned on a side of one surface of the sheet;
travelling hold means for holding the plotting means such that the plotting means travels back and forth in a first direction along the sheet stretched by the stretching means; the travelling hold means travelling back and forth in a second direction along the sheet stretched by the stretching means;
travelling pressure receiving means positioned on another surface of the sheet stretched by the stretching means, the travelling pressure receiving means travelling back and forth in the second direction concomitantly with back and forth movements of the travelling hold means in the second direction and including a pressure receiving surface that receives a pressing force of the plotting means through the sheet and extends in the first direction;
first supporting means for supporting the stretching means and the plotting means;
second supporting means for supporting the travelling pressure receiving means; and
coupling means for coupling the first supporting means to the second supporting means, so that the first supporting means and the second supporting means are separable from each other,
wherein, when the first and second supporting means are separated from each other, the sheet is stretched and fixed on the system by the stretching means, or is removed from the system.

12. The plotting system as claimed in claim 11, wherein the first supporting means is positioned over the second supporting means so that the sheet stretched by the stretching means is oriented horizontally, and so that images are formed on the sheet by the plotting means.

13. The plotting system as claimed in claim 12, wherein the first supporting means and the second supporting means are both connected to the coupling means at one end thereof so that the first supporting means is pivoted on the coupling means with respect to the second supporting means so as to be separated from the second supporting means.

14. The plotting system as claimed in claim 11, wherein the first and second supporting means engage each other, so that the sheet, stretched by the stretching means, is inclined at a specified angle, and so that images are formed by the plotting means from a diagonal position above the sheet.

15. The plotting system as claimed in claim 14, wherein the first supporting means and the second supporting means include lower ends, and are both connected to the coupling means at the lower ends thereof, so that the first supporting means and the second supporting means are relatively pivoted on the coupling means, so as to be separated from each other.

16. The plotting system as claimed in claim 11, further comprising a transparent cover provided on a side of the first supporting means, at which the sheet, stretched by the stretching means, can be seen over the plotting means.

17. The plotting system as claimed in claim 11, wherein the pressure receiving surface of the travelling pressure receiving means is a circumferential surface of a cylindrical body whose axis extends in the first direction.

18. The plotting system as claimed in claim 17, wherein the cylindrical body rotates such that the circumferential surface thereof comes in contact with the other surface of the sheet in a rolling manner as the travelling pressure receiving means travels in the second direction.

19. The plotting system as claimed in claim 11, wherein the pressure receiving surface of the travelling pressure receiving means is a flat surface extending in the first direction.

20. The plotting system as claimed in claim 11, wherein the plotting means is a pen for writing or cutting.

21. A plotting system comprising:
gripping means for gripping a sheet;
plotting means, positioned at one side of the sheet;
travelling hold means for holding the plotting means;
travelling pressure receiving means positioned at another side of the sheet, including a pressure receiving surface that receives a pressing force of the plotting means through the sheet;
first supporting means for supporting the gripping means and the plotting means;
second supporting means for supporting the travelling pressure receiving means; and
mounting means for mounting the first supporting means to the second supporting means, so that the second supporting means is movable with respect to said first supporting means for enabling said first and second supporting means to be separable from each other,
wherein, when the first and second supporting means are separated from each other, the sheet can be removed from the system.

* * * * *

UNITED STATES PATENT AND TRADEMARK OFFICE
CERTIFICATE OF CORRECTION

PATENT NO. : 5,291,659
DATED : March 8, 1994
INVENTOR(S) : Atsuhiro IWAKAWA

It is certified that error appears in the above-indentified patent and that said Letters Patent is hereby corrected as shown below:

```
At column 2, line 24 change "means" to ---device---.
At column 3, line 22 change "however." to ---However.---.
At column 6, line 25 change "12;" to ---12',---.
At column 6, line 27 change "22;" to ---22',---.
At column 7, line 27 change "15;" to ---15',---.
At column 7, line 34 change "preferably" to ---preferable---.
At column 8, line 26 change "62;" to ---62',---.
At column 8, line 37 change "upper end" to
---upper end part---.
At column 8, line 41 change "62;" to ---62',---.
```

Signed and Sealed this

Nineteenth Day of September, 1995

Attest:

BRUCE LEHMAN

*Attesting Officer*  *Commissioner of Patents and Trademarks*